United States Patent [19]
Nation

[11] Patent Number: 5,983,244
[45] Date of Patent: Nov. 9, 1999

[54] INDICATING WHEN CLICKABLE IMAGE LINK ON A HYPERTEXT IMAGE MAP OF A COMPUTER WEB BROWSER HAS BEEN TRAVERSED

[75] Inventor: George Wayne Nation, Eyota, Minn.

[73] Assignee: International Business Machines Corporation, Armonk, N.Y.

[21] Appl. No.: 08/721,490

[22] Filed: Sep. 27, 1996

[51] Int. Cl.[6] .................................................. G06F 17/21
[52] U.S. Cl. .......................................... 707/501; 707/513
[58] Field of Search ..................................... 707/501, 511, 707/513, 528, 10; 345/329, 331, 333, 334, 335, 339

[56] References Cited

U.S. PATENT DOCUMENTS

| | | | |
|---|---|---|---|
| 5,721,851 | 2/1998 | Cline et al. | 345/349 |
| 5,774,123 | 6/1998 | Matson | 345/357 |
| 5,778,372 | 7/1998 | Cordell et al. | 707/100 |

OTHER PUBLICATIONS

*Netscape 2 Unleased*, Sam.net Publishing, 1996, pp. 21–24, 36–37 and a screen printout.

Leach, "Netscape 2.0b4 BrowserWatch News", http://browserwatch.internet.com/news/story/netscape45.htm, Dec. 22, 1995, p. 1.

*Primary Examiner*—Stephen S. Hong
*Attorney, Agent, or Firm*—Karuna Ojanen

[57] ABSTRACT

The invention is a method to mark hypertext links in an image map that have been traversed. The invention actually modifies the image map of the links by inserting a marker or changing the color associated with the coordinates of a particular image link on the image map. The history files of links that have been traversed are first checked to determine if the image has changed or is otherwise out of date. The image map or a copy of the image map is then modified and displayed.

18 Claims, 13 Drawing Sheets

310 <HTML>

320 <A HREF="/cgi-bin/imagemap/nhome">
326 <IMG SRC="images/nhome.gif" ISMAP BORDER=0
328 WIDTH=481 HEIGHT=289
330 ALT="Home Page ISMAP"></a><BR>

FIGURE 3

```
ncsa-mosaic-history-format-1
Global
http://www.myri.com/myricom/bench/api_bandwidth.ps Thu Feb  1 13:10:03 1996
http://www.myri.com/myricom/bench/raw_bandwidth.ps Thu Feb  1 13:10:03 1996
http://www.nando.net/nt/nt/images/okcity/ntp2h.gif Thu Feb  1 13:10:03 1996
http://www.nando.net/nt/nt/images/okcity/ntp3h.gif Thu Feb  1 13:10:03 1996
http://www.nando.net/nt/nt/images/okcity/ntp10.gif Thu Feb  1 13:10:03 1996
http://www.nando.net/nt/nt/images/okcity/ntp11.gif Thu Feb  1 13:10:03 1996
http://www.nando.net/nt/nt/images/okcity/ntp12.gif Thu Feb  1 13:10:03 1996
http://espnet.sportszone.com/img/selectsport.gif Thu Feb  1 13:10:03 1996
http://www.cornell.edu/image/icons/icampus.GIF Thu Feb  1 13:10:03 1996
http://www.nando.net/cgi-bin/eric/subscribe.pl Thu Feb  1 13:10:03 1996
http://www.racecar.com/back.gif Thu Feb  1 13:10:03 1996
http://w3.rchland.ibm.com/cgi-bin/callup Thu Feb  1 13:10:03 1996
http://x86.metronet.com/undoc/ Thu Feb  1 13:10:03 1996
http://www.wunderground.com/conds/flurries.gif Thu Feb  1 13:10:03 1996
```

510 http://www.pc.ibm.com/cgi-bin/imagemap/nhome? 457,233 Fri Jul 26 08:29:36 1996
520 http://www.pc.ibm.com/cgi-bin/imagemap/nhome? 61,204 Fri Jul 26 08:28:17 1996
530 http://www.pc.ibm.com/cgi-bin/imagemap/nhome? 144,167 Fri Jul 26 08:28:35 1996
540 http://www.pc.ibm.com/cgi-bin/imagemap/nhome? 137,169 Fri Jul 26 08:29:57 1996
560 http://www.pc.ibm.com/cgi-bin/imagemap/nhome? 198,109 Fri Jul 26 08:28:55 1996
570 http://www.pc.ibm.com/cgi-bin/imagemap/nhome? 346,168 Fri Jul 26 08:29:24 1996
http://www.compuserve.com/ad3.gif Mon Feb 19 09:42:31 1996
http://www.compuserve.com/ad4.gif Mon Feb 19 09:42:37 1996
http://www.netframe.com/cgi-bin/imagemap.exe/navbar?328,23 Wed Feb 14 14:11:23 1996
http://www.thomson.com//IMAGES/botbar.gif?77,43 Thu Feb 1 13:10:03 1996
http://www.infoworld.com/pageone/advice/emailbut.gif Tue Jun 18 12:17:28 1996
http://www.infoworld.com/pageone/hedrgifs/hdopinion.gif Tue Jun 18 12:17:04 1996
http://www.pc.ibm.com/images/nhome.gif Fri Jul 26 08:27:53 1996
http://www.infoworld.com/pageone/opinions/advice/advice.htm Tue Jun 18 12:16:18 1996
http://www.infoworld.com/overviewmap/ovrvw.map?400,302 Wed Feb 14 15:49:39 1996
http://www.infoworld.com/overviewmap/ovrvw.map?420,278 Wed Feb 14 15:49:21 1996

FIGURE 5B

| 640 $c_x, c_y$ coordinate | 650 timestamp |
|---|---|
| 457,223 | Fri Jul 26 08:29:36 1996 |
| 61,204 | Fri Jul 26 08:28:17 1996 |
| 144,167 | Fri Jul 26 08:28:35 1996 |
| 137,169 | Fri Jul 26 08:29:57 1996 |
| 198,109 | Fri Jul 26 08:28:55 1996 |
| 346,168 | Fri Jul 26 08:29:24 1996 |

FIGURE 6B

Elements of the image list

| URL 710 | ISMAP 720 | timestamp 730 | pointer to imagedata 740 |
|---|---|---|---|
| http://www.pc.ibm.com/images/pcglobe2.gif | no | Tue Apr 13 00:00:00 1996 | ↕ |
| http://www.pc.ibm.com/images/nhome.gif | yes | Tue May 8 00:00:00 1996 | ↕ |
| http://www.pc.ibm.com/images/smallicon.gif | no | Wed Jun 17 00:00:00 1996 | ↕ |
| ...... | ...... | ...... | ...... |

↑ A (pointing to row 2)
↑ B (pointing to row 3)

FIGURE 7

16 x 16 pixel icon mask $h_x, h_y$ hotspot coordinate icon color (eg. black, white, red)

| dimension | hotspot | color | pointer to mask data |
|---|---|---|---|
| x,y | $h_x, h_y$ | color | •———▶ |

INDICATING WHEN CLICKABLE IMAGE LINK ON A HYPERTEXT IMAGE MAP OF A COMPUTER WEB BROWSER HAS BEEN TRAVERSED

BACKGROUND OF THE INVENTION

1. Technical Field

This invention relates generally to the field of computer networks. More specifically, the invention relates to a method which indicates what sources of information a user has consulted or has linked to on a computer information network, such as the World Wide Web.

2. Background Information

Of the many uses of computers, one of the main purposes is to acquire information, of which there are several pathways. One technique is to store and retrieve information directly from the computer that an individual is using, such as from internal memory or from diskettes or tapes directly attached to the computer. In fact, the personal computer was first marketed as being a "stand-alone" computer that was not connected or networked with a larger computer or outside memory. Another technique, which has grown explosively, is to connect the computer that an individual is using, called a client, to a computer network and acquire stored information on other computers, called servers. These computer networks continuously expand so that now an individual using a personal computer had access to infinitely more information than could be stored on his/her own computer. One such worldwide computer network of information is the Internet and various computerized methods to access the information on the Internet have developed. The World Wide Web (the web) accesses the Internet. The web is a computer network of interconnected servers and clients wherein information can be obtained simply by entering the address where the information is stored, its Universal Resource Locator (URL).

In the Internet and other computer environments which cross reference computer documents or interactive programs, hypertext is an approach to information management where nonsequential information is stored in nodes and the nodes are interconnected by links. The nodes may be in the same document, another document in the same computer client, or on another computer server. Thus, hypertext information management in a computerized system, such as the Internet, allows the user to retrieve information by jumping from topic to topic, from document to document, from node to node. Typically, web documents are accessed by entering the address, its Universal Resource Locator (URL), for that node. The user can directly type in the URL or the URL may be embedded in a link which is highlighted or otherwise featured text or image on which the user may move the cursor or the mouse pointer. The link contains the URL of the node and the user then initiates some computer action, such as clicking a computer mouse or entering a key stroke, etc., to connect to the link and display the information contained in that link. Nodes might contain various kinds of data, an online and real-time computer space of hypermedia commercial, educational, and entertaining information, e.g., text, graphics, audio, video, computer-animated images, film clips of animated scenes, digital sound, etc. Examples of hypertext languages include HyperText Markup Language (HTML) or HYPERCARD®. No matter where it originates, every web document or page uses HTML.

When a user travels through the web or any computer information management system, she finds it handy to know if she has visited that information site before, so various web browsing software or other hypertext software keeps a history of the various nodes or links that the user has traversed. The software indicates if a particular link has been traversed previously changing some feature of the text, e.g., color, font, underline, etc., but this is applicable only for textual links of alphanumeric characters. In other words, only those links that are in words or other textual format indicate if the link has been travelled.

The newer standards for hypertext links, however, are graphical images or pictures or bit map links wherein a region in the picture can define a hypertext link. There are no commercially available hypertext information software, such as World Wide Web browsers, that indicate in the graphical image if that link has been previously traversed.

SUMMARY OF THE INVENTION

It is thus an object of the invention to provide a means to indicate to the user of hypertext information that a graphical image or bit map link has been traversed previously.

Thus, the invention is a method which, based on the history and nature of the links that have been visited, modifies the graphical image of that link to indicate that the node has been traveled before. The method marks traversed hypertext clickable image links on an image map by first retrieving a history of image links that have been traversed and then determining if the image map has been modified since last viewed. If not, then the image link is modified at or near the coordinates of the image links on the image map with a marker and the image is displayed with the marker. The method also provides for determining if the last time the image was viewed precedes a preset user timestamp, and if not, then continuing with the modification of the image link.

Alternatively, the invention is a method of marking traversed image links identified by coordinates on an image map which first retrieves a history of image links that have been traversed and determines if the image links have been modified since last viewed. If not, rather than modifying the actual image link as above, the image link is copied. The copied image link is then modified at or near its coordinates with a marker. Then the copied and modified image link is overlayed onto the original image link and both are displayed. Again, modification of the copied image link is accomplished by adding the marker by changing the pixels in the vicinity of the coordinates of the image links that has been traversed. And, optionally, the method determines if the last time the image was viewed precedes a preset user timestamp, and if not, then continuing with modification and the display of the image links that have been traversed.

The invention includes a computer software program to traverse hypertext links, wherein the program has a means to generate an image map, the image map having clickable hypertext image links, a means to place a marker on the image map at or near the coordinate of one of the clickable hypertext image links has been traversed, and a means to display the image map having a marker. The invention also is an article of manufacture having a data storage medium tangibly embodying a program of making readable instructions executable by a digital processing apparatus to perform method steps for operating a digital computer system to mark traversed image links identified by coordinates on an image map, wherein the method comprises first, retrieving a history of image links that have been traversed and then determining if the image links have been modified since last viewed. If not, copying the image link and modifying the copied image link at or near its coordinates with a marker. The copied modified image link is then overlayed onto the original image link.

The actual or copied image link is modified by actually modifying the pixels in the vicinity of the coordinates of the image link to create a bit map image of an alphanumeric character or by changing the color or hue of the pixels in the vicinity of the coordinates. The method is designed to be incorporated into any hypertext browsing software and is intended to work with any hypertext information, such as the World Wide Web in HyperText Markup Language with ISMAP image links, or with hypertext documents wherein the image link is included within the same document.

BRIEF DESCRIPTION OF THE DRAWINGS

The invention will best be understood by reference to the following drawings and the accompanying description, wherein:

FIG. 3 is an example of applicable lines of code, written in HTML, of a hypertext base document of the home page image shown in FIG. 1.

FIG. 5 is a list of computer nodes to which a user has linked.

FIG. 7 is a list of images referenced by the home page shown in FIG. 1 and FIG. 2.

DESCRIPTION OF THE INVENTION

Figure 1:
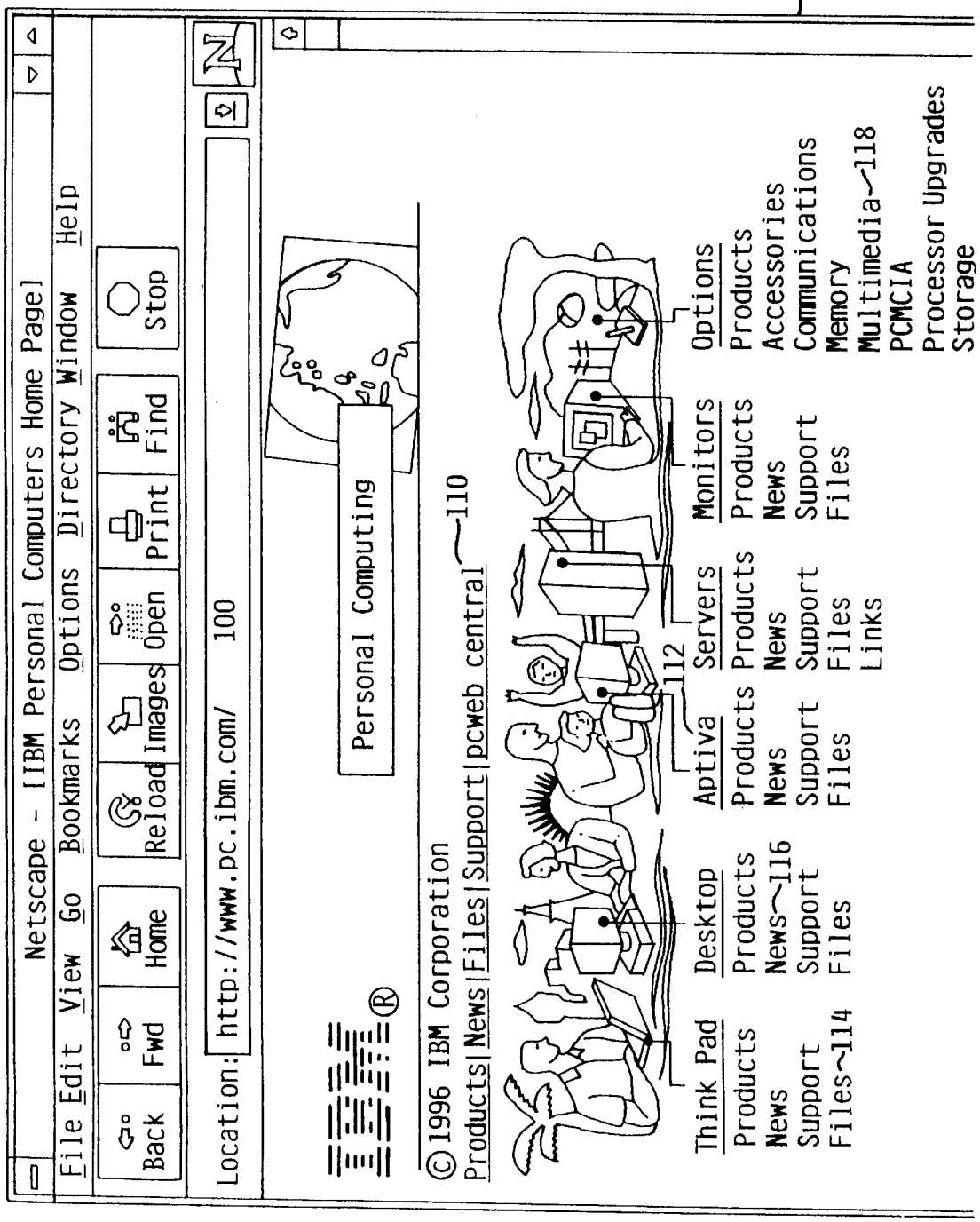
FIG. 1 is a picture of a hypertext computer monitor screen of a home page showing both graphical image links and textual links.

FIG. 1 is an example of a computer screen 10 from a web browser, Netscape®, and is the home page of the IBM® Personal Computers. The URL 100 of this particular node is http://www.pc.ibm.com/. This particular document is actually a "map" of both textual links and image links to guide the user to other documents or nodes. Textual links are shown as the words Products|News|Files|Support| pcweb central110. Below the pictures of people on the home page there are six columns. Within each column, there are bit maps as text icons, such as 112, 114, 116, and 118, although they could very well be other icons or pictures. These textual links 110 and the bit maps or image maps 112, 114, 116, and 118, are image links to other documents to which the user can connect by merely clicking the mouse or other computer entry when the cursor is situated in a region on or near these textual links or bit maps. However, once a user has traversed to a particular link, the bit map of the icon or image representing the link, unlike a textual link, does not change to indicate that the user has traveled to or has visited that link. Thus, the user must remember whether she or he has traversed an image link before.

Figure 2:
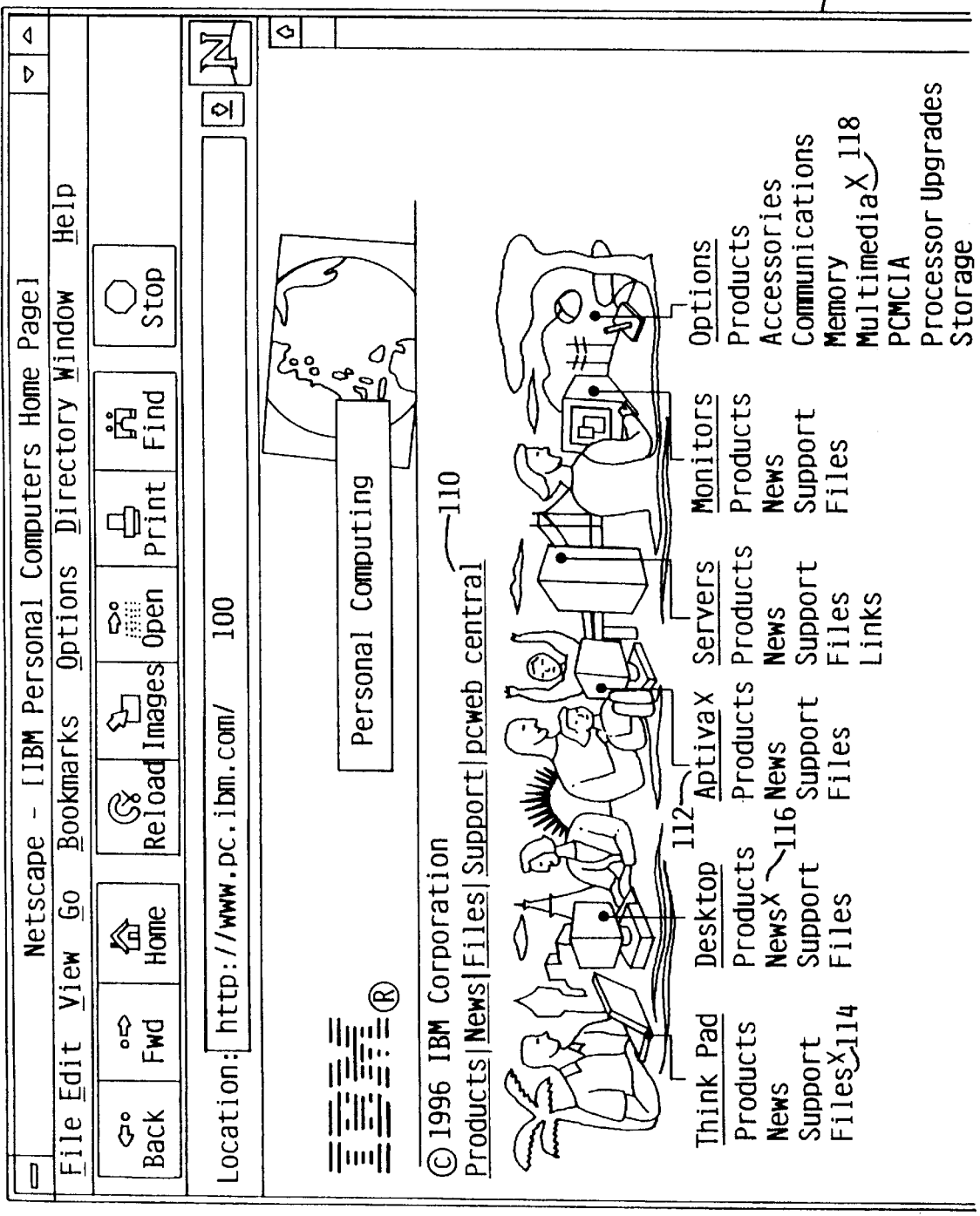
FIG. 2 is a picture of the hypertext computer monitor screen of the home page of FIG. 1 showing both graphical image links and hypertext links that have been previously traversed.

FIG. 2 illustrates the result of the invention on the same computer screen 10. Notice that there is an X indicated on the icon entitled, Aptiva 112, and on or near the icons entitled Files 114, News 116, and Multimedia 118. The user has visited these nodes before and so the bit map or graphical image link has been modified. This is the nature of the invention.

FIG. 3 illustrates applicable lines of code of the base document which creates the home page shown in FIGS. 1 and 2. As mentioned earlier, every web document, including this one, is written in HTML, as shown in line 310. Of particular interest to the invention is line 320. The character A 322 represents that the characters following it are an anchor for a link or another node and HREF="/cgi-bin/image map/nhome" 324 is the URL of the node. The coding in the subsequent lines 326, 328, 330 set forth the placement and words of more features of the image. The tag ISAMP 332 in line 326 is also important because it indicates that the image is an image map. An image map is a clickable image that establishes a link to the node indicated by the image by placing the cursor in a particular region in the image map. The actual physical coordinates of the image define the region with which an URL is associated. So the image portrayed in FIGS. 1 and 2 is an image map and links can be established to other locations or nodes by clicking on a particular coordinate associated with or assigned to that node. By clicking on or near the region 114 in FIG. 1 having unique coordinates on the map of FIG. 1, the user links to the node "Files" for THINKPAD® users.

Figure 4A:
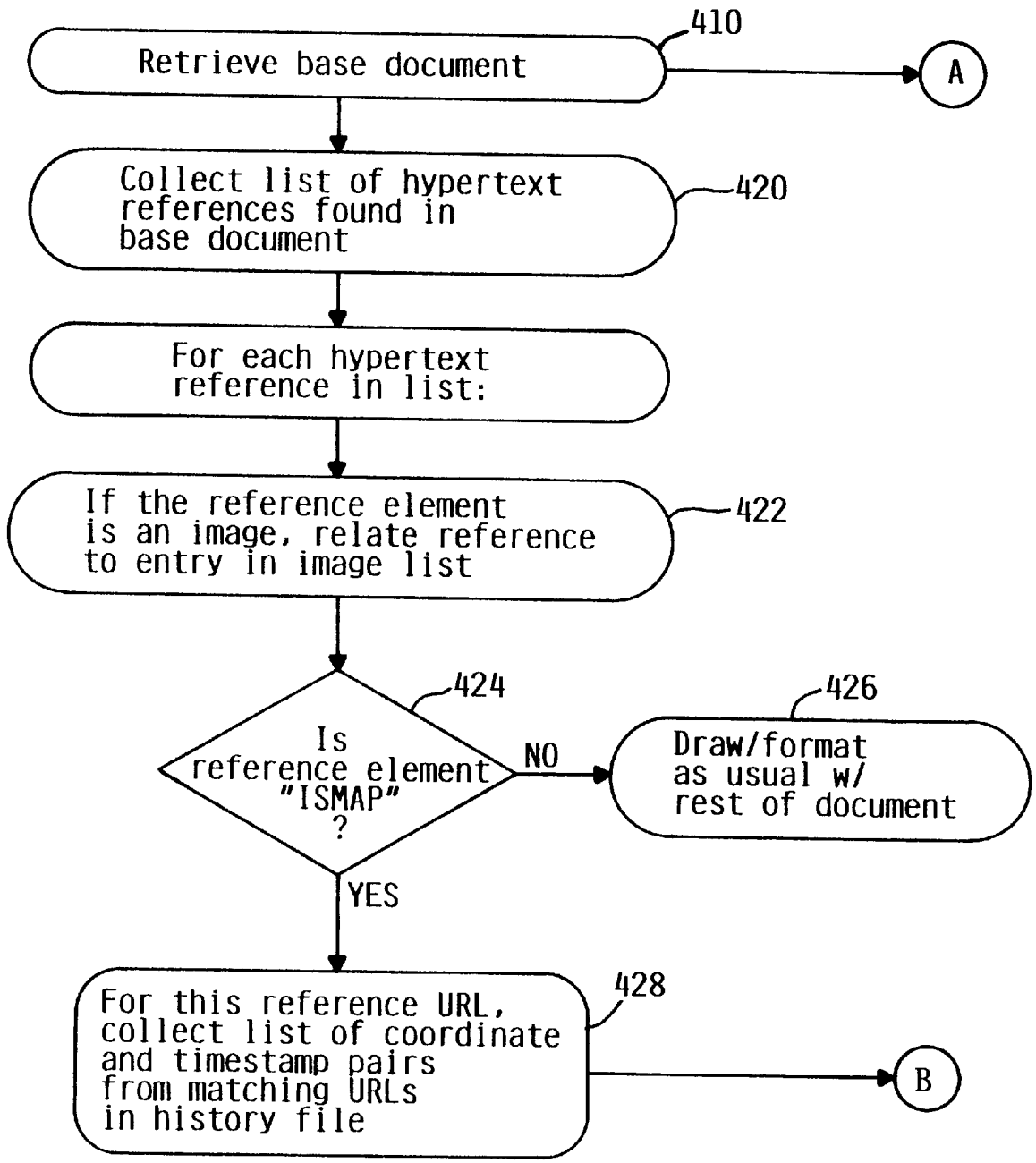
FIG. 4 is a flow diagram of the process of the invention incorporated into a web browsing program.
Figure 4B:
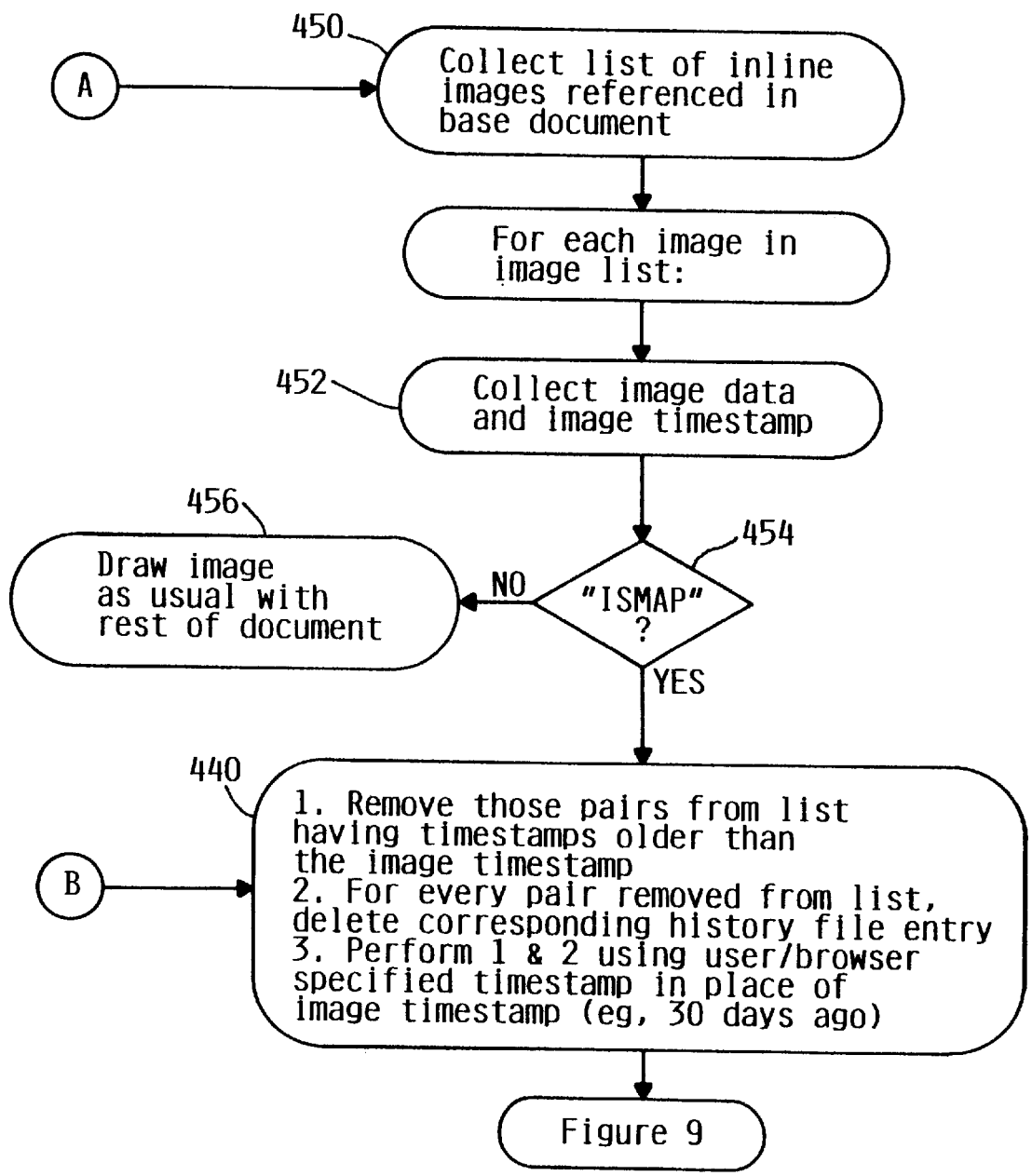

FIG. 4 is a flowchart of the method of the invention incorporated into the web browsing software. At step 410, the base document requested by the user who entered the URL: http//www.pc.ibm.com is retrieved by the web browsing software and the image shown in FIGS. 1 and 2 is displayed on the computer monitor. After the base document is retrieved, steps 420 and 450 proceed simultaneously; at step 420 the web browser formulates a list of hypertext references in the base document. This list is shown in FIG. 5. In step 450 of FIG. 4 the web browser collects the inline images referenced in the base document. Then, at step 422, the inventive method inquires for each hypertext reference in the list of FIG. 5 whether the reference is an image; and if so, correlates the hypertext reference to an entry in the image list collected in step 450. At step 424 the invention inquires if the image is a bit mapped image, which means the image itself has dimensions and a click anywhere on that image will take the user to the node attributed to those coordinates. In HTML, if the image has these qualities, it has the attribute ISMAP. The invention will only work with bit map images that are clickable; so that in HTML, the invention will only work with those images that have an ISMAP attribute. If the image does not have the attribute ISMAP, the image is printed as usual by the web browser or other commercial graphical drawing or image creation routines at step 426 and the invention herein does not function. If, however, the image is clickable and if in HTML, the image does have the ISMAP attribute, then at step 428, the coordinates and timestamps of the previous ISMAP references are tallied and collected in a graphical form of FIG. 7 from the matching URLs in the history file of FIG. 5.

Simultaneously, on the other branch of the process, the web browser analyzes the collected list of inline images referenced in the base document at line 450, and at step 452 collects the image data and timestamp for each image, see FIG. 7. At step 454, for each image, the invention inquires if the bit map images are clickable, and in this particular embodiment using HTML, if the image has the attribute ISMAP. If the image is not clickable, then the image is printed as usual at step 456 and the invention herein does not function.

If, however, the image is clickable, the two branches of the process converge at step 440, so that only those images that are: (a) in the list of hypertext references; and (b) in the list of image references; and (c) are clickable, e.g., have the attribute ISMAP, are compared. The comparison begins at step at 440(1) and for each image in the reference list, the invention determines if the bit map images have been modified since the last visit to that particular home page or base document. In other words, the image list is checked to see if the image map was modified by the owner of the document or node since it was last viewed. If so, then at 440(1) and 440(2), that reference is removed from the history file at 440(2) and the invention does not operate on these images because there is no assurance that the coordinates are the same on the modified bit map. The other inquiry in step 440(3) depends upon whether the user has specified a personal timestamp. If so, then the invention discards those references that were viewed in the past before the specified time. For example, the user may determine that she/he does not wish to have more than a two-week or thirty-day history of the nodes that she/he visited. Therefore, if the image on the history file was viewed before this maximum time, that bit map is discarded. The image is then displayed as usual by the web browser without modification. Those remaining references which are clickable, e.g., have the ISMAP attribute and which are still in vogue are then modified using the coordinates of the image by the insertion of a marker, such as a change in color on all or part of the image or a letter or other image, as will be discussed in more detail with reference to FIG. 9. With the image thus modified, the drawing or image creation routine of the web browser then draws the modified image; and the image as shown in FIG. 2 will be displayed.

FIG. 5 is a history 500 provided by the web browser of the nodes to which the user has linked and is the list of references reviewed in step 420 of the flowchart of FIG. 4. Each line in the history 500 represents a particular node to which the user has linked in the past. Each line, and as an example only consider line 510, has at least two entries: the URL at 512 and timedate stamp at 516. Lines 510, 520, 530, 540, 560, 570 specifically refer to the map of the links of FIGS. 1 and 2. These lines also have the $C_x,C_y$ coordinates of the location of the link on the map; for instance, the x,y coordinates (457, 223) 514 might refer to the link entitled FILES 114 of FIGS. 1 and 2. It is from the list of FIG. 5 that the invention first inquires if the clickable image has been changed since last viewed.

Figure 6A:
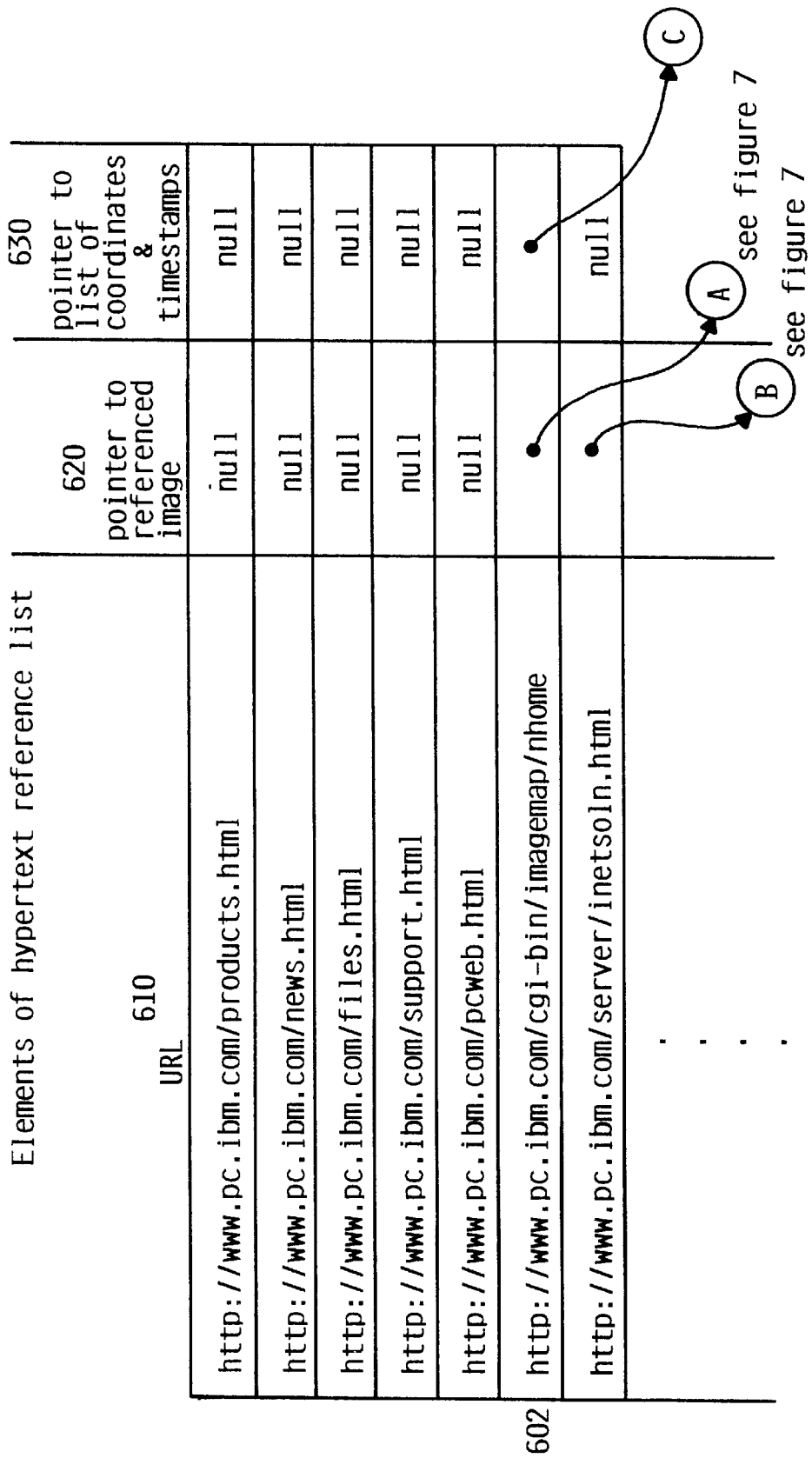
FIG. 6 is a table of the hypertext reference list used by the invention.

FIG. 6 lists in tabular form the elements of the hypertext reference list of the home page of FIG. 1. For each document that is referenced, the first column 610 is the URL, the second column 620 is a pointer to any referenced image in the image list of FIG. 7; and the third column 630 is a pointer to a list of the $C_x,C_y$ coordinates and timestamps previously traversed for this URL, e.g., see column 640 and column 650 of FIG. 6. In FIG. 6, line 602 incorporates lines 510, 520, 530, 540, 560, 570 of FIG. 5. The coordinates listed at column 640 are the $C_x,C_y$ coordinates of those references, such as 514, in FIG. 5; the timestamps 650 are those timestamps of the references, such as 516, in FIG. 5.

FIG. 7 is a list of images referenced in this home page of FIG. 1. Column 710 indicates the URL of the image. The ISMAP field 720 indicates only whether the image is an ISMAP. The timestamp 730 holds the date and time the image was last modified by the owner/creator of the image. If this time stamp at 730 is more recent than the timestamp of column 650 in FIG. 6, the image map has been changed by its owner/creator and the image is printed without modification. The image data field 740 holds a pointer to an address in memory containing the image data. Image data includes all the data required to create the image, such as the color, the pixel size, the dimensions, the position within the field of view in any one of a variety of image formats. The invention then uses the image data to modify the image by, for instance, overlaying icon masks onto the image.

Figure 8A:
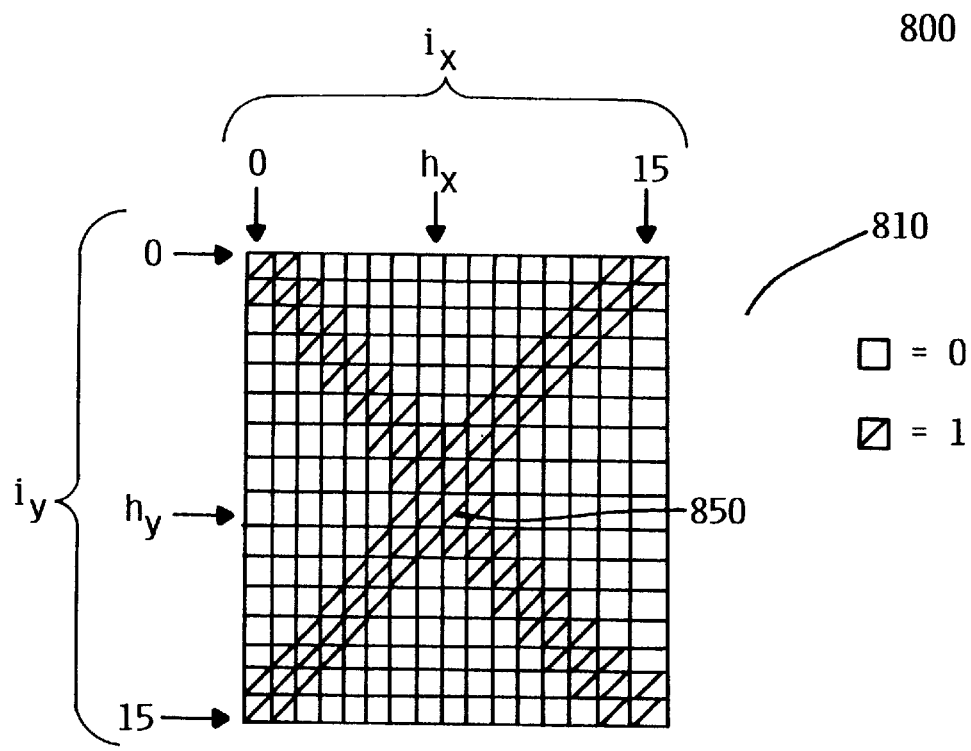
FIGS. 8a and 8b illustrate two icons used as markers to modify the image link.
Figure 8B:
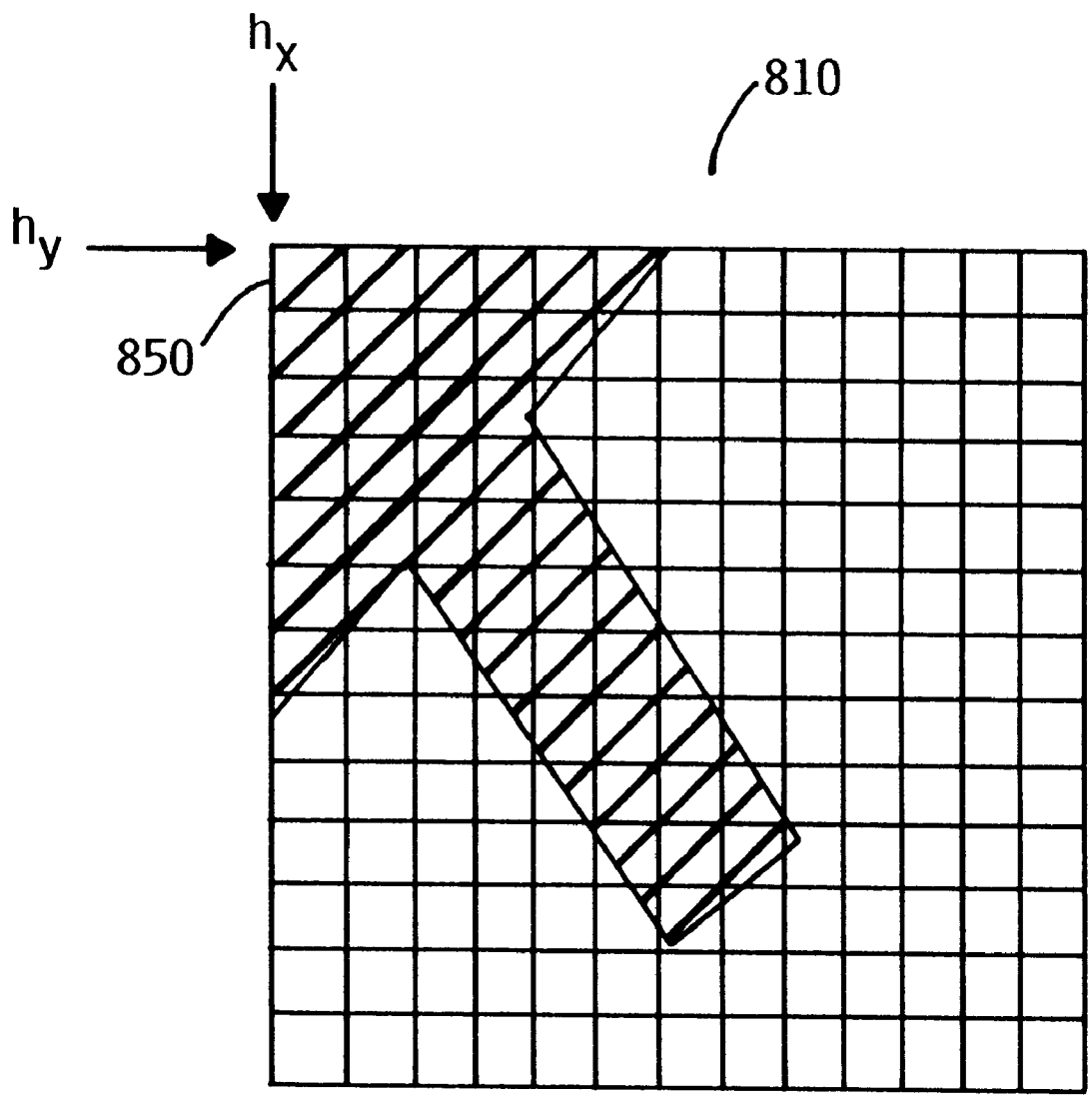

FIGS. 8*a* and 8*b* are examples of pixel icon masks that can be overlaid onto the image. The icon 810 in FIG. 8*a*, arbitrarily, is an X; it could be an arrow ↑ as in FIG. 8*b* or anything at all. The icon is a mask of pixels, e.g., sixteen pixels, square; each pixel having a coordinate $(i_x,i_y)$. A pixel having a part of the icon has a bit value of one, i.e., $(i_x,i_y=1)$ whereas the bit value of a background pixel is zero $(i_x,i_y=0)$; it could just as easily be the other way around. The hotspot 850 refers to a specific pixel coordinate $(h_x,h_y)$ which determines the placement of the icon on the copied image map.

Figure 9:
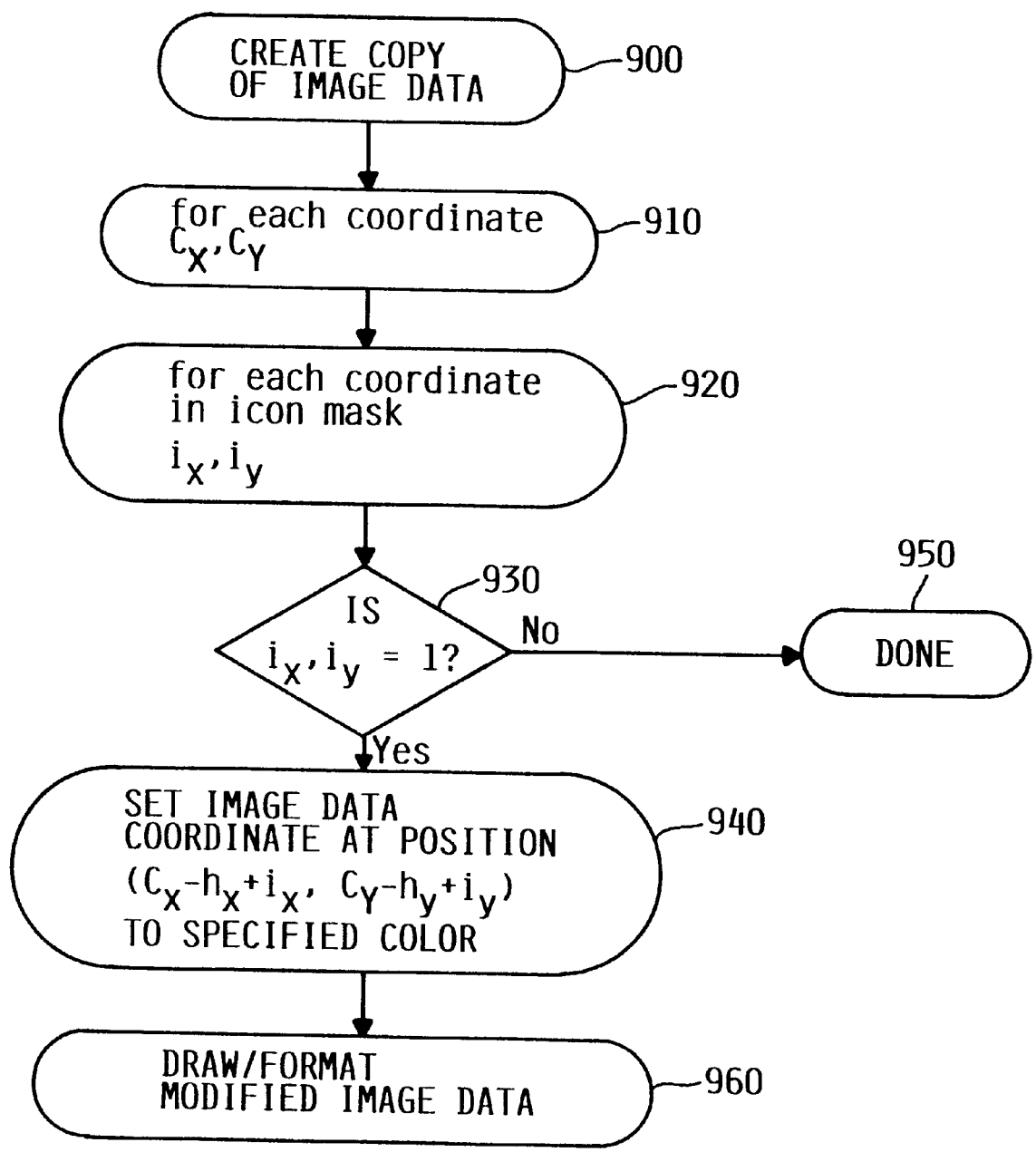
FIG. 9 is a flow diagram of the process of the invention modifying the image data.

FIG. 9 is a flowchart that demonstrates one embodiment of how the image map is modified by the invention. Step 900 follows from Step 440 of FIG. 4 so that only those referenced image links that have been viewed within a recent past, that are clickable, e.g., ISMAP, image maps, and that have not been changed by the originator of the document are processed further. First at Step 900, the image data of a referenced image link is copied from an address given by the pointer in column 740 of FIG. 7. Once the image data has been copied, then, at step 910, the coordinates at column 640 on FIG. 6, labelled $C_x,C_y$, of each link that has been traversed previously is used. For each of the links that have been traversed, the hotspot $(h_x,h_y)$ 850 of the icon mask 810 is positioned onto or near the link coordinate $C_x,C_y$. The hotspot 850 on the icon X is its center and this center would be positioned on the coordinate of the link on the image map, $C_x,C_y$. If the icon is an arrow, such as 810 in FIG. 8*b*, then the apex of the arrow might be the hotspot 850 positioned on the coordinate $C_x,C_y$. Then at Step 920, for each pixel of the icon $(i_x,i_y)$, Step 930 checks if the bit value of the pixel in the icon mask is one, then a change is made to the appearance at the corresponding pixel on the copy of the image map, given as $C_x-h_x+i_x, C_y-h_y+i_y$, Step 940. If, however, the bit value of the pixel on the icon mask is zero, no changes are made to those corresponding pixels on the copy of the image map as in Step 950. Then, the modified image is overlaid onto the original image and both are printed to yield the display of FIG. 2, Step 960.

The above paragraphs describe only one method to accomplish the modification of image maps by copying the image data and leaving the original image data untouched. Another way to modify image maps to show that a link has been traversed is to overlay multiple images, one for each coordinate, each the size of the icon and then displaying the original image with the overlaying image. Thus, the original image map and multiple smaller icon bit maps overlaying the original would be printed. Yet another technique would be to modify the image data itself, without making a copy and then printing the modified image data.

Thus, what has been presented is a technique to modify image maps to show that a particular image link has been traversed. While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims. HTML is used as only one embodiment because the popular web browsers are written in HTML; the invention, however, is applicable to other hypertext languages which have an image map of clickable images.

I claim:

1. A method to mark traversed hypertext clickable image links on an image map, comprising the steps of:
   (a) retrieving a history of the coordinates of at least one hypertext clickable image link on a hypertext image map having a plurality of the hypertext clickable image links, of which at least one of said image links has been traversed;
   (b) determining if the image map has been modified since last viewed;
   (c) if not, modifying the image map at or substantially near the coordinates of the at least one traversed image link with at least one marker;
   (d) displaying the image map with the at least one marker.

2. The method of claim 1, further comprising the step of:
   (b-1) determining if the last time the image map was viewed precedes a preset user timestamp, and if not, then continuing with steps (c) and (d).

3. The method of claim 1, further comprising the step of:
   (c-1) modifying the pixels at or substantially near the coordinates of the at least one traversed image link to create a bit map image of the marker.

4. The method of claim 1, wherein said image map is written in HyperText Markup Language.

5. The method of claim 4, wherein at least one of said image links has an ISMAP attribute.

6. The method of claim 3, wherein the marker is an alphanumeric character.

7. The method of claim 3, wherein the marker is a change in the shading or hue of the at least one traversed image link.

8. A method to mark traversed hypertext clickable image links on an image map, comprising the steps of:
   (a) retrieving a history of the coordinates on an image map indicating the position of at least one of said hypertext clickable image links that has been traversed, said image map having more than one hypertext clickable image links;
   (b) determining if the image map has been modified since last viewed;
   (c) determining if the last time the image map was viewed precedes a preset user timestamp;
   (d) if neither (b) nor (c), then modifying the image map with a marker by modifying the pixels at or substantially near the coordinates of the at least one traversed image link to create a bit map image of the marker;
   (e) displaying the image map with the marker.

9. A method of marking traversed image links identified by coordinates on an image map, comprising:
   (a) retrieving a history of the coordinates identifying at least one image link that has been traversed on an image map having a plurality of said image links;
   (b) determining if the image map has been modified since last viewed;
   (c) if not, copying the image map;
   (d) modifying the copied image map at or substantially near the coordinates of the at least one traversed image link with a marker;
   (e) overlaying the modified image map onto the original image map.

10. The method of claim 9, wherein the step of modifying further comprises:
    (d-1) adding the marker by changing the pixels at or substantially near the coordinates of the at least one traversed image link.

11. The method of claim 9, further comprising the step of:
    (b-1) determining if the last time the image map was viewed precedes a preset user timestamp, and if not, then continuing with steps (c), (d), and (e).

12. The method of claim 10, wherein said image map is written in HyperText Markup Language.

13. The method of claim 12, wherein at least one of said image links has an attribute ISMAP.

14. The method of claim 10, wherein said marker is an alphanumeric character.

15. The method of claim 10, wherein the marker is a change in the shading or hue of at least one traversed image link.

16. A method to mark traversed hypertext clickable image links each having respective coordinate on an image map having a plurality of said hypertext clickable image links, said method comprising retrieving a history of the respective coordinates and modifying the image map at or substantially near the respective coordinates that have not changed of each traversed image link on the image map.

17. A computer browser to traverse hypertext links, said browser comprising:
    (a) means to generate an image map having a plurality of clickable hypertext image links;
    (b) means to retrieve a history of the coordinates Of the clickable hypertext image links on the image map;
    (c) means to place a marker on the image map at or near the coordinates of at least one of the clickable hypertext image links that has been traversed and whose coordinates have not chained; and
    (d) means to display the image map having the marker.

18. An article of manufacture, comprising a data storage medium tangibly embodying a program of making readable instructions executable by a digital processing apparatus to perform method steps for operating a digital computer system to mark traversed image links identified by coordinates on an image map, said method steps comprising the steps of:
    (a) retrieving a history of the coordinates on the traversed image links on the image map, the image having a plurality of image links;
    (b) determining if the image map has been modified since last viewed;
    (c) if not, copying the image map;
    (d) modifying the copied image map at or substantially near the coordinates of the traversed image links with a marker;
    (e) overlaying the modified image map onto the original image map.

* * * * *

UNITED STATES PATENT AND TRADEMARK OFFICE
CERTIFICATE OF CORRECTION

PATENT NO. : 5,983,244

DATED : November 9, 1999

INVENTOR(S) : George Wayne Nation

It is certified that error appears in the above-identified patent and that said Letters Patent is hereby corrected as shown below:

IN THE CLAIMS

Claim 16, Column 8, Line 22: "coordinate" should be --coordinates--,

Claim 17, Column 8, Line 32: "Of" should be --of--,

Claim 17, Column 8, Line 37: "chained" should be --changed--,

Claim 18, Column 8 Line 47 "image having" should be --image map having--.

Signed and Sealed this

Thirtieth Day of May, 2000

Attest:

Q. TODD DICKINSON

*Attesting Officer*      *Director of Patents and Trademarks*